United States Patent

[11] 3,604,105

| [72] | Inventor | Ernest Heyworth |
| | | Fullerton, Calif. |
| [21] | Appl. No. | 825,187 |
| [22] | Filed | May 16, 1969 |
| [45] | Patented | Sept. 14, 1971 |
| [73] | Assignee | Fridair Industries |
| | | Redondo Beach, Calif. |

[54] SEAL ASSEMBLY FOR THREADED PARTS AND METHOD
3 Claims, 7 Drawing Figs.

[52] U.S. Cl. .................................................. 29/520,
313/118, 29/25.13, 29/25.12
[51] Int. Cl. .................................................. B21d 39/00,
B23p 11/00
[50] Field of Search .................................................. 29/520,
25.13, 511, 25.12, 25.1; 313/118

[56] References Cited
UNITED STATES PATENTS

| 3,276,499 | 10/1966 | Reusser | 29/520 |
| 3,325,194 | 6/1967 | Grawey | 29/520 |
| 3,332,141 | 7/1967 | Hopp | 29/520 |
| 3,367,228 | 2/1968 | King | 29/520 |
| 3,384,952 | 5/1968 | Pentesco | 29/511 |
| 3,399,705 | 9/1968 | Breed | 29/520 |

Primary Examiner—John F. Campbell
Assistant Examiner—Donald P. Rooney
Attorneys—Arthur W. Fuzak and Donald J. Ellingsberg

ABSTRACT: This disclosure describes an internally and an externally threaded member with an annular groove in the face of the internally threaded member. A deformable member is positioned in generally confronting relationship with the groove and the two threaded members are threaded together with the deformable member being axially compressed therebetween to cold flow the material thereof into the groove. Such cold flow of the deformable material causes a tight seal to be formed between the two members.

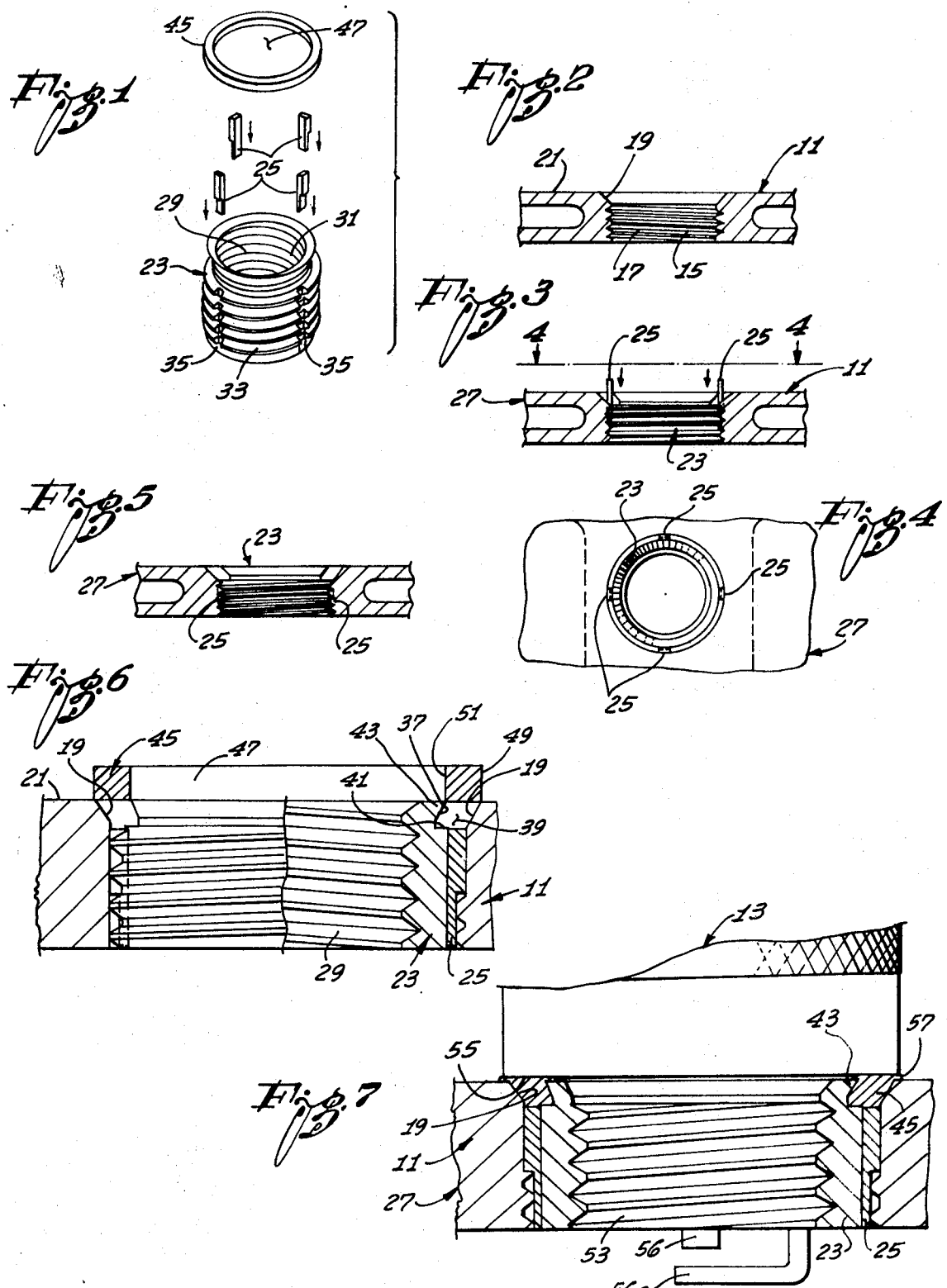

SEAL ASSEMBLY FOR THREADED PARTS AND METHOD

BACKGROUND OF THE INVENTION

Many parts which must be detachably connected are joined by screw threads. One problem with threaded parts is that the threads often become damaged or won through, for example, excessive torquing of the members or rough handling.

When this occurs, the internally threaded member or the body member is drilled and tapped and an internally and externally threaded sleeve-type insert is threaded into the tapped hole of the body member. The internal diameter of the insert is selected so as to be compatible with the externally threaded member.

Threaded members inherently provide a fluid leakage path, and the use of an insert provides a second leakage path which lies between the insert and the body member. The amount of leakage increases if the insert is keyed to the body member. Keying of the insert to the body member is often necessary to prevent relative rotation between the insert and the body member during actual use thereof.

The obvious solution to this problem is to merely provide a radially enlarged gasket to cover the interfaces between the externally threaded member and the insert and between the insert and the body member. This obvious solution was attempted with spark plugs and found inadequate as leakage around the gasket occurred. Such leakage was apparently due to the inability of the spark plug to firmly hold the gasket down at radially outward points.

SUMMARY OF THE INVENTION

The present invention provides a seal assembly which tightly seals the interfaces between the insert and the body member. A concept of this invention is to form a groove in one face of one of the threaded members and cold flow or extrude the material of a deformable member into the groove. The cold flow of the deformable member can be advantageously carried out by the threaded members themselves as they are tightened. During the tightening of the threaded member, the deformable member is subjected to axial compression to thereby cause extrusion of the deformable material into the groove and into the minute surface irregularities of the threaded members to form a tight seal.

To be effective, the groove must not be located radially inwardly of one of the interfaces which are to be sealed. Preferably, the groove is in the internally threaded member and overlies the interface between the insert and the body member so that cold flow of material therein will tightly seal this interface. In addition, such location lies radially outwardly of the interface between the externally threaded member and the insert so that it can prevent leakage radially outwardly of this interface.

The deformable member should have sufficient volume to more than fill the groove so that with the deformable member displaced into the groove, some of the material thereof will project out of the groove and be in tight sealing engagement with the externally threaded member. Any material which will cold flow and which will form a seal can be utilized. For example, the deformable member could be aluminum or copper.

The groove preferably has radially spaced inner and outer side surfaces formed, respectively, by a peripheral surface of the insert and a surface of the body member. The outer peripheral surface preferably tapers radially outwardly as it extends axially outwardly of the body m ember. This inclined or tapered surface acts to crowd or urge the displaced material from the deformable member radially inwardly toward the insert to assist in the formation of a fluidtight seal.

The inner side surface of the groove preferably defines an overhang and may be, at least in part, generally parallel to the outer side surface The inclined outer side surface crowds the displaced material from the deformable member under the overhang to thereby firmly retain the deformable member as a permanent part of the internally threaded member.

Although the deformable member may be of many different shapes, to facilitate the extrusion thereof, the outer periphery of the deformable member preferably does not lie radially outwardly of the outer periphery of the groove. Similarly, the inner periphery of the deformable member preferably does not lie radially inwardly of the inner periphery of the groove. Thus, the deformable member is preferably in the form of a washer which is substantially coextensive with the open end of the groove.

The invention, both as to its organization and method of operation together with further features and advantages thereof, may best be understood by reference to the following description taken in connection with the accompanying drawings.

BRIEF DESCRIPTION OF THE DRAWINGS K

FIG. 1 is an exploded perspective view of the insert, the keys and the deformable member.

FIG. 2 is a fragmentary sectional view through an internally threaded body member.

FIG. 3 is a fragmentary sectional view similar to FIG. 2 with an insert having keys attached thereto mounted in the body member.

FIG. 4 is a fragmentary plan view taken along line 4—4 of FIG. 3.

FIG. 5 is a fragmentary sectional view similar to FIG. 3 with the keys driven axially downwardly to rigidly retain the insert on the body member.

FIG. 6 is an enlarged fragmentary sectional view similar to FIG. 5 with the deformable member positioned in confronting relationship to the groove.

FIG. 7 is a fragmentary sectional view of the assembly after the deformable member has been displaced into the groove by the spark plug.

DESCRIPTION OF THE PREFERRED EMBODIMENT

Referring to the drawings, FIG. 1 illustrates the components which are to be utilized in assembling a body member 11 (FIG. 2) and an externally threaded member, which in the embodiment illustrated, is in the form a a sparkplug 13 (FIG. 7). The body member 11 which, in the embodiment illustrated, may be a part of an engine, has a hole 15 projecting therethrough with the surface of the hole 15 projecting therethrough with the surface of the hole having threads 17. The upper end of the hole 15 is countersunk to define a frustoconical surface 19 which tapers radially outwardly as it extends toward a face 21 of the body member 11.

The internal threads 17 on the body member 11 may be the threads originally formed therein, or they may have formed after the original threads were damaged. In this latter event the hole of the body member 11 is redrilled and tapped to form the threads 17.

After the body member 11 has been properly prepared, an insert 23 having a plurality of keys 25 affixed thereto is threaded into the hole 15 as shown in FIG. 3. The resultant composite structure illustrated in FIG. 3 defines an internally threaded member 27. In the position shown in FIG. 3, the keys 25 project axially above the insert 23 and have not been driven downwardly.

The insert 23 (FIG. 1) is a sleevelike member having an aperture 29 extending therethrough and internal threads 31 and external threads 33. The threads 33 are interrupted by a plurality of keyways 35, one being provided for each of the keys 25. In the position shown in FIG. 3, the keys are partly received within the keyway 35.

A s shown in FIG. 4, keys 25 are distributed circumferentially of the insert 23. In the embodiment illustrated, four equally spaced keys 25 are provided, although any suitable number of keys may be utilized. As shown in FIGS. 1 and 6, the lower portions of the keys have a lesser radial dimension than the upper portions of the keys.

Next, the keys 25 are driven axially downwardly to the position shown in FIG. 5. This can be accomplished with a hammer and the keys easily cut through the threads 17 of the body member 11 as necessary. The keys 25 positively lock the insert 23 and the body member 11 against relative rotation.

As shown in FIG. 6, the insert 23 has a peripheral surface which defines an inner side surface 37 of a groove 39. The insert 23 also has an upwardly facing shoulder 41 which defines a portion of the bottom wall of the groove 39. The surface 19 of the body member 11 defines an outer side surface of the groove 39. A portion of the surface 37 is frustoconical and tapers radially outwardly as it extends toward the face 21 to define an overhanging lip 43.

Thus, the groove 39 is positioned between the insert 23 and the body member 11 with the bottom of the groove 39 overlying the interface between the insert and the body member. The groove 39 is annular in plan.

As shown in FIG. 6, a deformable member 45 is positioned in overlying confronting relationship with the groove 39. The deformable member 45 has an aperture 47 which, in the embodiment illustrated, is concentric with the aperture 39 through the insert 23. Although the deformable member 45 may be of various configurations, the configuration thereof in plan preferably is substantially coextensive with the groove 39 at the location where the groove 39 meets the face 21. PREferably, the outer periphery 49 of the deformable member 47 does not extend radially outwardly beyond the location at which the surface 19 meets the face 21, and the inner periphery 51 of the deformable member preferably does not extend radially inwardly of the location at which the surface 37 meets the upper end of the insert 23. The member 45 preferably has a greater axial dimension than the groove 39. In the embodiment illustrated, the member 45 is generally square in cross section although other cross sectional shapes may be utilized.

The spark plug 13 (FIG. 7) has an externally threaded shank 53 adapted to be readily received by the internal threads 31 of the insert 23. The sparkplug 13 also has a shoulder 55 in axial alignment with the groove 39 and the member 45. The sparkplug has the usual electrodes 56 and 56a between which an ignition spark can be formed. By turning the threaded shank 53 into the insert 23, the shoulder 55 is drawn toward the upper surface of the member 45. Ultimately, the member 55 is axially squeezed between the shoulder 55 and the surface 19 of the body member 11. When sufficient axial compressive force is applied, the material of the member 45 extrudes or cold flows into the groove 39 with the inclined surface 19 crowding the displaced material radially inwardly beneath the overhanging lip 43 and tightly against the insert 23.

The volume of the member 45 is greater than the volume of the groove 39 so that an annular portion 57 of the member 45 is not squeezed into the groove but remains in sealing tight engagement with the shoulder 55. The cold flow of the member 45 causes the material thereof to flow into the minute surface irregularities of the insert 23, the keys 25, the body member 11 and the shoulder 55 as well as into any interfaces or crevices provided adjacent the member 45. This forms a very effective seal between all of the members.

Although the illustrated embodiment of the invention is directed to an assembly including a sparkplug and a sparkplug insert, it will be apparent to those having ordinary skill in the art that the concept of this invention are equally applicable to many different assortments of threaded members. Although an exemplary embodiment of the invention has been shown and described, many changes, modifications and substitutions may be made by one having ordinary skill in the art without necessarily departing from the spirit and scope of this invention.

I claim:
1. A method of installing a sparkplug comprising:
   providing a body member having a hole with screw threads thereon, said hole opening at one face of the body member;
   screwing an externally threaded insert into the hole with the insert having a threaded aperture extending therethrough in the same general direction as said hole;
   forming a groove between said body member and said insert with the groove opening at said one face and with the groove circumscribing said insert;
   positioning an apertured readily deformable member in confronting relationship with said groove with the aperture of the deformable member leaving said aperture of the insert substantially uncovered by said deformable member;
   providing a sparkplug having an externally threaded shank portion and a shoulder; and
   turning the shank portion of said sparkplug into the threaded aperture of the insert to interconnect the insert and the sparkplug and to cause the deformable member to be squeezed between said shoulder and at least one of said insert and said body member to cold flow at least some of the material of said deformable member into said groove to form a tight seal between said insert and said body member and to at least substantially prevent leakage between the spark plug and the insert.

2. A method as defined in claim 1 wherein said step of forming includes counter sinking said hole to define a sloping surface with the sloping surface causing said hole to be flared outwardly adjacent said one face and said step of turning includes displacing at least some of the material of the deformable member against said sloping face to permit said sloping face to crowd at least some of said displaced material radially inwardly toward the insert.

3. A method as defined in claim 1 including keying the insert to the body member prior to said step of turning.

UNITED STATES PATENT OFFICE
CERTIFICATE OF CORRECTION

Patent No. 3,604,105      Dated September 14, 1971

Inventor(s) Ernest Heyworth

It is certified that error appears in the above-identified patent and that said Letters Patent are hereby corrected as shown below:

Assignee should be Tridair Industries instead of Fridair Industries

Signed and sealed this 2nd day of May 1972.

(SEAL)
Attest:

EDWARD M. FLETCHER, JR.
Attesting Officer

ROBERT GOTTSCHALK
Commissioner of Patents